Oct. 27, 1970  H. STACKEGARD  3,536,930
CONVERTER STATION WITH ALTERNATIVE CONNECTIONS
BETWEEN A D.C. NETWORK AND TWO A.C. NETWORKS
Filed Nov. 28, 1966
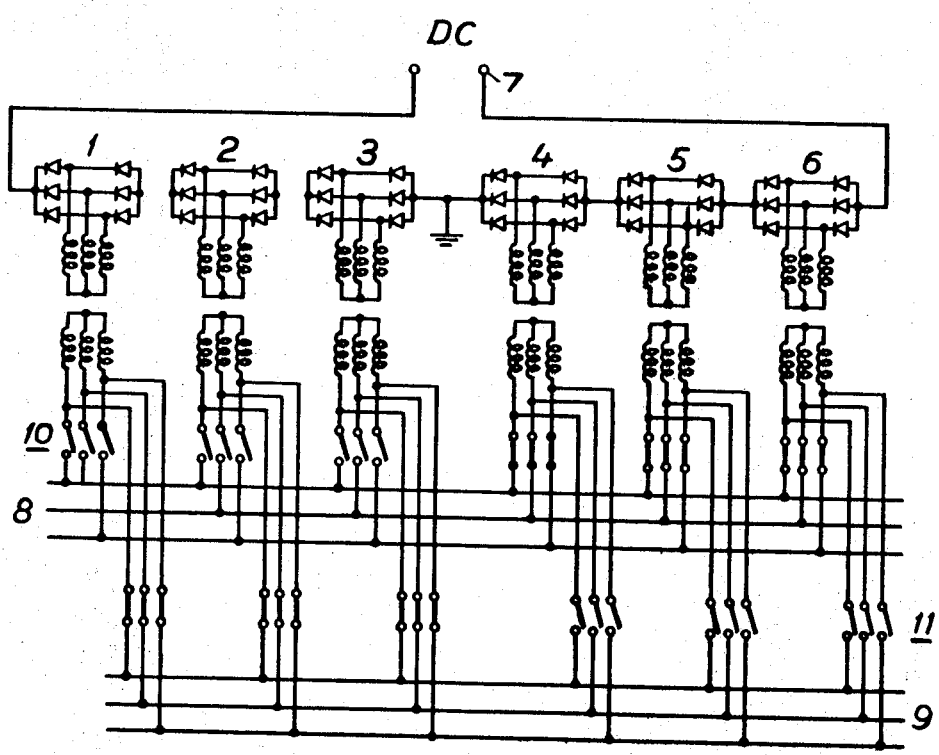
INVENTOR.
Hans Stackegård
BY
Bailey, Stephens & Huettig
ATTORNEYS 3,536,930
CONVERTER STATION WITH ALTERNATIVE
CONNECTIONS BETWEEN A D.C. NETWORK
AND TWO A.C. NETWORKS
Hans Stackegard, Ludvika, Sweden, assignor to Allmänna
 Svenska Elektriska Aktiebolaget, Vasteras, Sweden, a
 Swedish corporation
Filed Nov. 28, 1966, Ser. No. 597,402
Int. Cl. H02j 1/00
U.S. Cl. 307—82                                        1 Claim

ABSTRACT OF THE DISCLOSURE

A converter station with a plurality of converters and two or more A.C. networks is provided with switches for alternately connecting the converters to the A.C. networks.

---

The present invention relates to a converter station for connecting together a D.C. transmission line with at least two A.C. networks.

As is known the specific transmission costs for a transmission, for example a D.C. power transmission, are substantially lower the greater the power involved and in the case of transmission of energy over long distances a very large power must often be reckoned with in order to bring down the specific transmission costs to a level where the transmission is economically worthwhile. However, it is possible that the transmission power necessary for economical reasons is so great that it cannot suitably be fed into a single A.C. current network but must be divided into two or several. In this way the D.C. transmission may for example be connected to a number of converter stations each connected to an A.C. network, but considerably better economy is attained if the transmission from direct current to alternating current can take place in a single converter station at the end of the long transmission line. In the case of large power however there must with such transmission be a correspondingly large receiving A.C. network, which possibly can only be obtained by connecting together a plurality of smaller networks. Such a connection of several A.C. networks to a single very large network may however be combined with great difficulties and costs, since the connection involves high short circuiting power and stability problems between the different networks. Such drawbacks are avoided according to the present invention according to which a D.C. transmission may be connected together with a number of A.C. networks with the help of a single converter station.

A converter station according to the invention is characterised in that the station in a known way comprises a number of constituent converters, the D.C. sides of which are connected to said D.C. transmission line, while the A.C. side of at least some of the constituent converters are arranged for alternative connection to one of the A.C. networks. In this way it is possible to divide a large transmission power from a D.C. transmission over several A.C. networks without connecting the networks together directly, whereby the problems of high short circuiting power and synchronising of the networks are avoided. The possibility for alternative connection of the different constituent converters to the different networks involves further the advantage that by connecting the different constituent converters the transmitted power can be arbitrarily divided between the different A.C. networks in a favorable manner.

The invention will be otherwise further described with reference to the accompanying drawing, which shows a converter station according to the invention for connecting together a D.C. transmission and two A.C. networks. The drawing shows a converter station comprising six constituent converters 1–6, the D.C. sides of which are connected in series to a D.C. transmission line 7. The different constituent converters could with two groups of breakers 10 and 11 alternatively be connected to two A.C. networks 8 and 9 respectively. In the shown case the constituent converters 1–3 have been connected to the network 9, while the constituent converters 4–6 have been connected to the network 8. From the figure it is evident that the connection of the constituent converters to the two A.C. networks may be arbitrarily varied depending on the power distribution.

In the shown case all six constituent converters have been arranged for alternative connection to the two networks, but in many cases it may be imagined that each network has a certain minimum power requirement, in which case it may be practical to arrange in advance a number of constituent converters corresponding to each of the networks for connection only to such a network. In addition a number of constituent converters may then be arranged for alternative connection to the two networks in order to take care of the varying power distribution between the networks. Further, it is seen that it is possible in a simple way, namely with the help of extra breakers, to connect further A.C. networks to the station if this is desirable.

From the above it is evident that the invention is especially advantageous when the different A.C. networks lie in the vicinity of each other. If this is not the case, one can choose between supplying each network with a converter station and connecting together these stations with D.C. lines as proposed earlier, or according to the present invention carrying A.C. lines from the different networks to the common station. Hereby the advantage is gained of better utilisation of the station by connection of the constituent converters corresponding to the actual power distribution.

I claim:
1. A static converter station comprising a plurality of static converters; a D.C. network comprising a D.C. transmission line and at least two separate A.C. networks connected to said converter station, said static converters being connected on their D.C. sides to said D.C. network; and means for connecting each of said static converters on their A.C. sides to at least one of said A.C. networks; said connecting means including switching means for selectively connecting at least some of said static converters on their A.C. sides to either of said A.C. networks.

References Cited

UNITED STATES PATENTS 2,208,183    7/1940   Alexanderson _____ 321—27 X

FOREIGN PATENTS 524,234   11/1953   Belgium.
1,317,663    3/1952   France.
1,130,630     1962   Germany.

ROBERT K. SCHAEFER, Primary Examiner

H. J. HOHAUSER, Assistant Examiner